July 13, 1965 B. E. STENTZ ETAL 3,194,346
BUMPER FLOOR LOCK FOR WHEELED VEHICLES
Filed Aug. 9, 1963 2 Sheets-Sheet 1
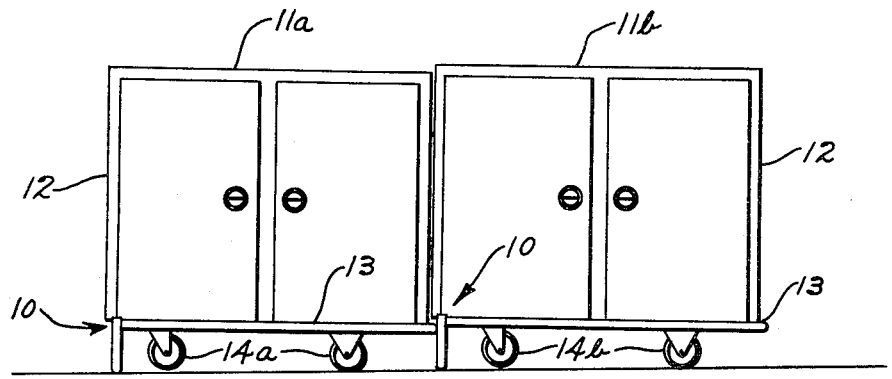
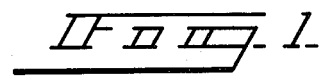
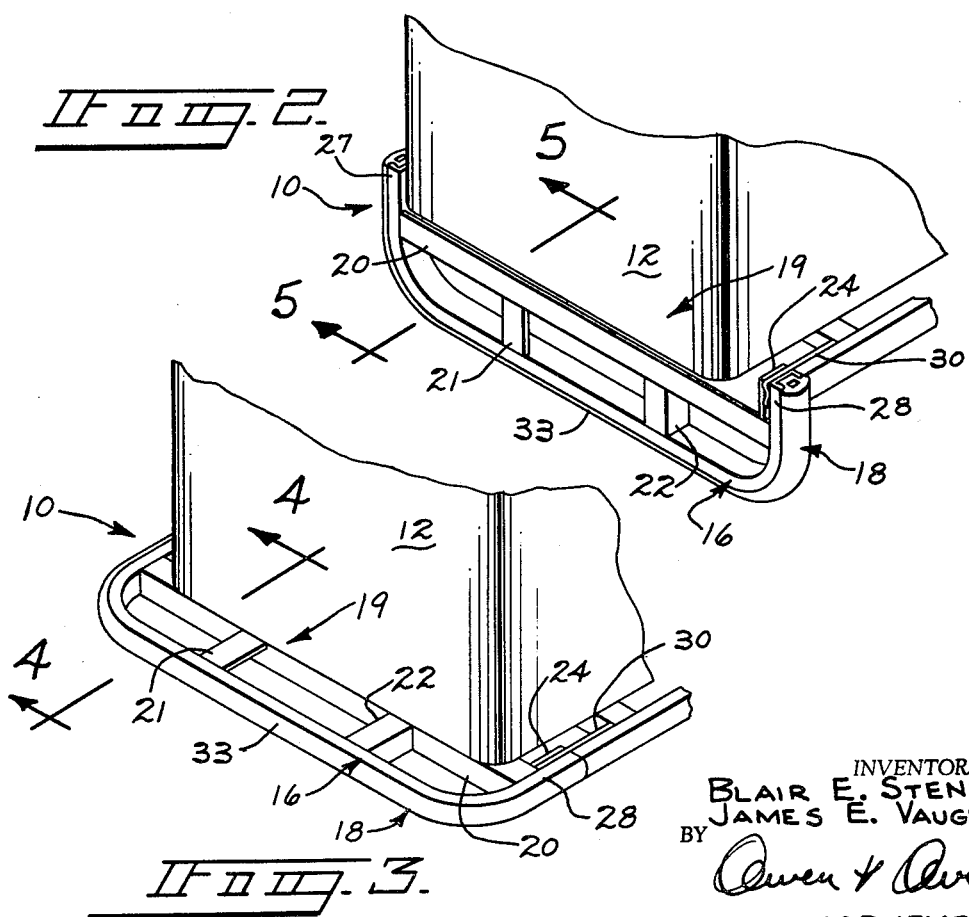
INVENTORS.
BLAIR E. STENTZ
JAMES E. VAUGHT
BY
ATTORNEYS

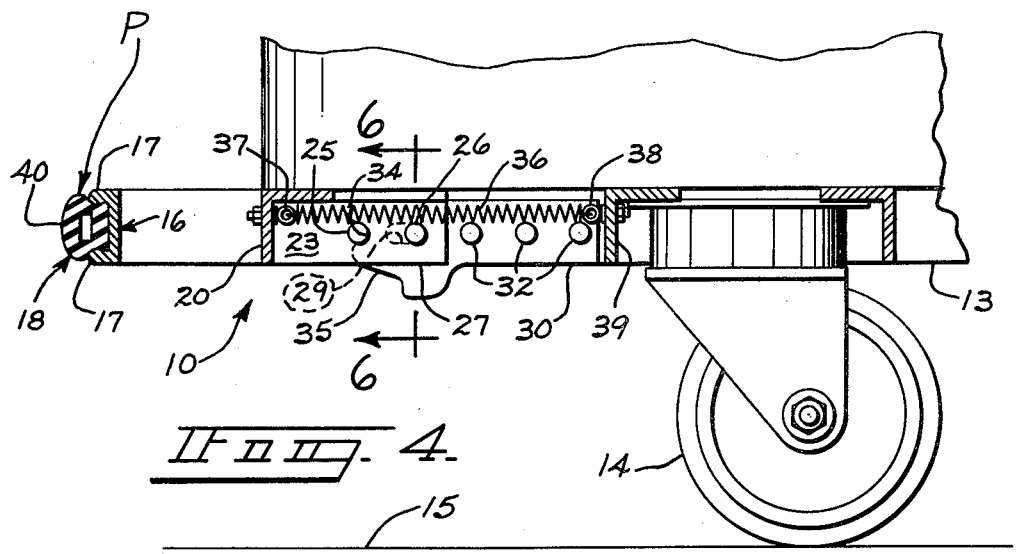
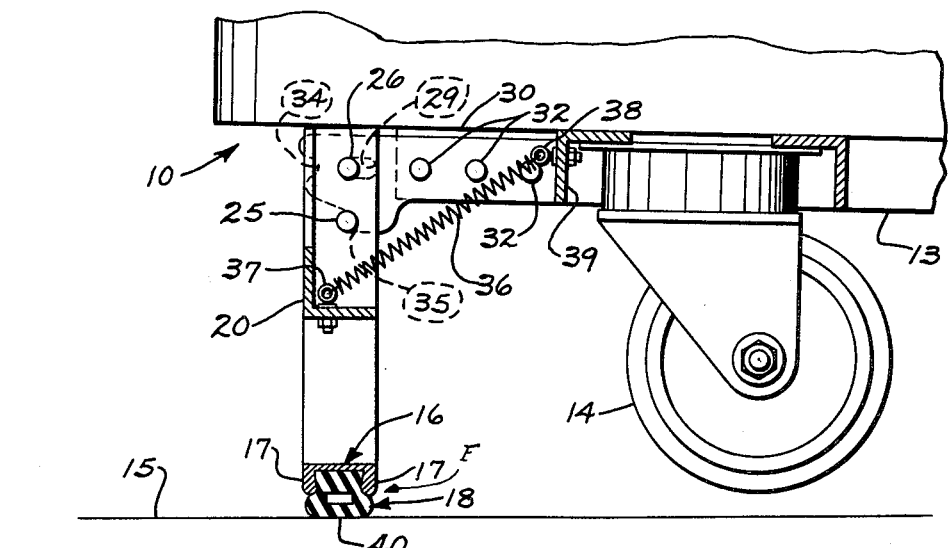
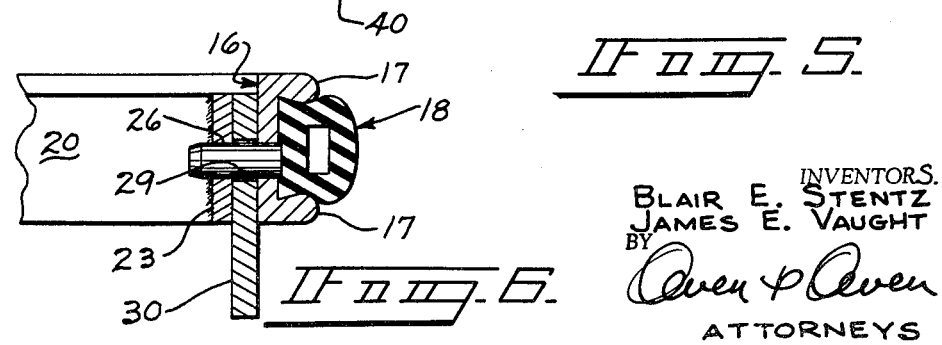

United States Patent Office 3,194,346
Patented July 13, 1965

3,194,346
BUMPER FLOOR LOCK FOR WHEELED VEHICLES
Blair E. Stentz and James E. Vaught, Murfreesboro, Tenn., assignors to United Service Equipment Co., Inc., Palmer, Mass., a corporation of Delaware
Filed Aug. 9, 1963, Ser. No. 301,128
3 Claims. (Cl. 188—5)

This invention relates to a bumper floor lock and, more particularly, to a bumper floor lock for use on a wheeled vehicle such as a food service cart.

When food service carts are used in a large food handling and serving operation, for example, at a factory, several food service carts are normally used in the operation. For example, one cart is loaded with utensils, another with food trays, another with beverage containers, and one or more with bulk food. Of course, the number of food service carts involved depends upon the size of the food serving operation. The food service carts are transported to a central area or "cafeteria" area of the factory and placed in their respective locations in the food service operation.

If no braking device is provided on the individual food service cart, an accidental bumping of the cart will move the cart from its stationary position in the food serving operation thereby disrupting said operation. Also, when the utensils or food items are being removed from the individual food service carts, it is important that the cart remain in a stationary position.

Another problem encountered in a food handling operation is that the service carts, which are often constructed of stainless steel or aluminum, become marred or dented upon impact with, for example, a wall of a factory corridor or another service cart.

In order to protect such a cart from impact, it is conventional to provide a bumper which protrudes beyond the body of the cart and which usually has a resilient or shock absorbing surface. Such protruding bumpers prevent such carts from being positioned in close adjacency as would be preferable in a "cafeteria" arrangement, as earlier described.

It is the object of the present invention to provide a bumper for a wheeled vehicle, for example a food service cart, which can be swung out of the way to provide for positioning two such vehicles in close end-to-end adjacency.

Another object of this invention is to provide an extended bumper for the protection of the body of a vehicle, such as a food service cart, which bumper may be swung out of the way to provide for close positioning of two of such vehicles and, when so swung away, functions as a floor lock to hold the vehicle in the selected location.

Further objects of this invention will become apparent from the following specification and drawings, in which:

FIG. 1 is a front elevational view, showing a pair of carts, each having a bumper embodying the invention, positioned in close end-to-end relationship, and illustrating how the bumper also functions as a floor lock;

FIG. 2 is a fragmentary, front quarter view in perspective showing a bumper floor lock according to the instant invention in "locked" position;

FIG. 3 is a fragmentary, front quarter view in perspective, similar to FIG. 2, but showing a bumper floor lock according to the instant invention in "bumper" position;

FIG. 4 is a fragmentary, vertical sectional view taken along the line 4—4 of FIG. 3 and shown on an enlarged scale;

FIG. 5 is a fragmentary, vertical sectional view taken along the line 5—5 of FIG. 2 and shown on an enlarged scale; and FIG. 6 is a fragmentary, vertical sectional view taken along the line 6—6 of FIG. 4 and shown on a further enlarged scale.

Briefly, the present invention is a bumper floor lock for use on a wheeled vehicle. The bumper floor lock comprises a laterally extending, horizontal bumper bar. The bumper bar is mounted on the vehicle by a connecting structure which is fastened at one end to the bar and the other end is pivotally mounted on the vehicle for rotation between a first, or "bumper" position, and a second, or "locked" position, around an axis parallel to the bumper bar. Releasable means are provided for securing the bumper bar in either the "locked" position, as shown in FIGS. 2 and 5 or in the "bumper" position, as shown in FIGS. 3 and 4.

An embodiment of the invention is shown in the drawings with a bumper floor lock being generally indicated at 10. In FIG. 1, the bumper floor lock 10 is illustrated as being designed for use on food service carts 11a and 11b, which may be identical, as illustrated, or may be carts of different characteristics. Of course, the bumper floor lock can be used equally well on other types of wheeled vehicles.

Each of the food service carts 11a and 11b has a body 12 mounted on a frame 13. Wheels 14 support the body 12 upon a surface 15, for example, a hospital corridor or factory floor, or the like. A horizontal laterally extending, bumper bar 16 protrudes from the body 12 when the bumper floor lock 10 is in the first or "bumper" position as shown in FIG. 3.

As shown in FIG. 6, the bumper bar 16 is preferably constructed with outwardly directing ribs 17 between which a resilient bumper 18 is retained. The bumper 18 is formed from a compressible material such as rubber, for example, by extrusion, so that any impact stresses received when the food service cart 11 collides with another object will be absorbed by the bumper 18, thereby preventing injury to the vehicle body 12 or to the other object.

A connecting structure generally indicated at 19 and comprising a transverse support bar 20, reinforcing bars 21 and 22, and pivot plates 23 and 24, is welded, or otherwise suitably fastened to the bumper bar 16.

Referring to FIGS. 4 and 6, a pair of dowels 25 and 26 is secured to each of the pivot plates 23 and 24 and, in the instant embodiment, to an end portion 27 or 28 of the bumper bar 16. The rearward dowel 26 extends through an elongated hole 29 in a hinge plate 30. Each of the hinge plates 30 is secured to a side member of the frame 13 by rivets 32.

The connecting structure 19 is therefore pivotally mounted for rotation around a laterally extending horizontal axis. The axis of rotation is parallel to a main portion 33 of the bumper bar 16. The axis of rotation extends transversely across the body 12 and in the instant embodiment is located by the elongated holes 29.

As shown in FIGS. 4, 5 and 6, the hinge plates 30 lie between the pivot plates 23 or 24 and the end portions 27 or 28 of the bumper bar 16. Each of the hinge plates 30 has a dowel-engaging recess 34 formed in one end. The end of the hinge plate 30 also has a dowel stop 35. When the bumper lock 10 is in the first or "bumper" position, the dowels 25 are releasably retained in the recesses 34 by means of a pair of tension springs 36. One end of each of the tension springs 36 is secured to an eye-bolt 37 which is fastened to the transverse support bar 20 and the other end is connected to an eye-bolt 38 which is secured to a horizontal, transversely-extending reinforcing bar 39 which is an integral part of the frame 13. When the bumper floor lock 10 is in the second or "locked" position, the springs 36 retain the dowels 25 against the dowel stops 35 at the ends of the plates 30.

When it is desired to move the bumper floor lock 10 from the "bumper" position (FIG. 4) to the second or "locked" position (FIG. 5), a downward pressure is applied by the operator, for example with his foot, on the bumper bar 16, at approximately point P in FIG. 4. When the force applied at point P exceeds that of the tension springs 36, the dowels 25 are moved out of the dowel-engaging recesses 34 and the bumper bar 16 is rotated downwardly in a counterclockwise direction. When the bumper bar 16 reaches the second or "locked" position, shown in FIG. 5, the dowels 25 engage the dowel stops 35 to prevent further counterclockwise rotation. Tension of the springs 36 swings the bar 16 and connecting structure 19 so that the dowels 26 shift to the outer ends of the elongated holes 29 carrying the structure "over center."

The length of the connecting structure 19 is such that the distance from the longitudinal axis of rotation to the outer edge 40 of the bumper bar 16 is greater than the distance from the axis of rotation to the surface 15. Therefore, when the bumper floor lock 10 is rotated downwardly into the second or "locked" position, the wheels 14 are elevated slightly from the surface 15. When the bumper floor lock is in the second position friction between the bumper 18 and the surface 15 prevents the food service cart 11 from moving under the force of gravity or under the force of an accidental "bumping." The tension springs 36 restrain the bumper bar 16 against movement in a clockwise direction from its "locked," over-center position.

When it is desired to move the food service cart 11, and the bumper floor lock 10 is in the second or "locked" position shown in FIG. 5, the operator applies pressure with his foot, or otherwise, on the bumper bar 16, for example at point F as shown in FIG. 5. The dowels 26 are shifted to the rear of the elongated holes 29, and the dowels 25 moved from their positions against the dowel stops 35 and slide up into the dowel-engaging recesses 34. The tension springs 36 retain the bumper floor lock 10 in this position which is the first or "bumper" position.

While the invention has been disclosed in conjunction with a specific form and disposition of the parts, it should be expressly understood that numerous modifications and changes may be made without departing from the spirit and scope of the appended claims.

What we claim is:

1. A bumper floor lock for use on a wheeled vehicle having a vehicle body and a set of wheels for supporting said body on a surface, said bumper floor lock comprising a laterally extending, horizontal bumper bar, a connecting structure fastened at a first end to said bumper bar, means for pivotally mounting a second end of said connecting structure for rotation between a first position and a second position around an axis parallel to said bumper bar, said axis being so positioned relative to said body and the length of said connecting structure being such that said bumper bar protrudes horizontally beyond said vehicle body when in said first position, and the distance from said axis to the outer edge of said bumper bar being greater than the distance from said axis to said surface, whereby at least one of said wheels is elevated from said surface when said bumper bar is rotated downwardly into said second position and into engagement with said surface, said pivotally mounting means comprising a hinge plate extending from said vehicle body and defining on its outer edge an engaging recess and a spaced apart stop, said second end of said connecting structure being pivotally mounted to said hinge plate and having an engaging member which is releasably seated in said engaging recess when said bumper bar is in said first position and is adjacent said stop when said bumper bar is in said second position, and releasable means for biasing said bumper bar and said connecting structure in either of said first and second positions.

2. A bumper bar floor lock according to claim 1 in which said releasable means includes a tension spring operably connected at opposite ends to said vehicle body and said connecting structure, whereby said bumper bar and connecting structures are releasably secured under tension when said bumper bar and connecting structures are located in either of said first and second positions.

3. A bumper floor lock according to claim 1, wherein said hinge plate defines a horizontally elongate pivot opening and a pivot dowel on said second end of said connecting structure slidably and pivotally mounted within such opening.

References Cited by the Examiner

UNITED STATES PATENTS

| | | | |
|---|---|---|---|
| 2,054,838 | 9/36 | Short | 293—71 |
| 2,789,854 | 4/57 | Hope | 293—69 |
| 2,812,041 | 11/57 | Mugler | 188—5 X |
| 2,886,139 | 5/59 | Wilson | 188—5 |

ARTHUR L. LA POINT, *Primary Examiner.*

DUANE A. REGER, *Examiner.*